United States Patent [19]
Lesesky et al.

[11] Patent Number: 5,798,577
[45] Date of Patent: Aug. 25, 1998

[54] TRACTOR/TRAILOR CRANKING MANAGEMENT SYSTEM AND METHOD

[75] Inventors: Alan C. Lesesky, Charlotte, N.C.; Bruce A. Purkey, Rogers, Ark.; Bobby Ray Weant, Rock Hill, S.C.

[73] Assignees: Vehicle Enhancement Systems, Inc., Rock Hill, S.C.; Purkey's Fleet Electrics, Inc., Rogers, Ark.

[21] Appl. No.: 608,814

[22] Filed: Feb. 29, 1996

[51] Int. Cl.$^6$ .................................................. F02N 11/08
[52] U.S. Cl. ........................... 307/10.7; 307/10.6; 307/10.1; 123/179.3; 123/179.78; 123/179.25; 209/38 R; 209/40 A; 209/40 B; 320/38
[58] Field of Search ........................... 307/9.1–10.8; 180/65.1–65.8; 320/13, 35, 36, 39, 40; 290/38 R, 41, 40 A, 40 B; 123/179.1, 179.3, 179.24, 179.28, 179.25, 179.13, 179.15

[56] References Cited

U.S. PATENT DOCUMENTS

| | | | |
|---|---|---|---|
| 4,731,601 | 3/1988 | Nowakowski | 340/52 R |
| 4,994,683 | 2/1991 | Yamamoto | 290/31 |
| 5,293,076 | 3/1994 | Fukue | 290/40 C |
| 5,332,958 | 7/1994 | Sloan | 307/10.7 |
| 5,343,137 | 8/1994 | Kitaoka et al. | 307/10.7 |
| 5,349,931 | 9/1994 | Gottlieb | 307/10.6 |
| 5,385,126 | 1/1995 | Matthews | 123/179.21 |
| 5,455,463 | 10/1995 | Langnickel et al. | 307/10.7 |
| 5,459,357 | 10/1995 | Minks | 307/10.7 |

*Primary Examiner*—William M. Shoop, Jr.
*Assistant Examiner*—Peter Ganjian
*Attorney, Agent, or Firm*—Bell Seltzer Intellectual Property Group of Alston & Bird LLP

[57] ABSTRACT

Vehicle cranking management systems and methods are provided for a vehicle preferably including a tractor mechanically connected to a trailer. Electrical energy is enabled to transfer from a battery of the vehicle to an electrical accessory load, when a battery output voltage signal is above a first predetermined threshold voltage, but is inhibited from transferring from the battery to the electrical accessory load if the battery output voltage signal is below a second predetermined threshold voltage. The first and second predetermined threshold voltages may be determined responsive to a sensed temperature of the vehicle engine, preferably a sensed temperature of oil present in the engine. In addition, electrical energy is enabled to transfer from the battery to a starter which cranks the vehicle's engine if a cranking command signal to crank the engine is asserted for less than a first predetermined time interval. If a cranking command signal is continuously asserted for a period longer than the first predetermined time interval, however, electrical energy is inhibited from transferring from the battery to the starter for a second predetermined time interval, to thereby inhibit the engine from being cranked during the second predetermined time interval. The vehicle may also include a speed sensor which senses a rotational speed of the engine, and electrical energy may be inhibited from transferring from the battery to the starter responsive to the sensed engine speed being greater than a predetermined threshold speed.

29 Claims, 8 Drawing Sheets

TRACTOR/TRAILOR CRANKING MANAGEMENT SYSTEM AND METHOD

FIELD OF THE INVENTION

This invention relates to starting systems in vehicles, in particular, to systems and methods for managing a cranking system of a tractor/trailer vehicle.

BACKGROUND OF THE INVENTION

Figure 1:
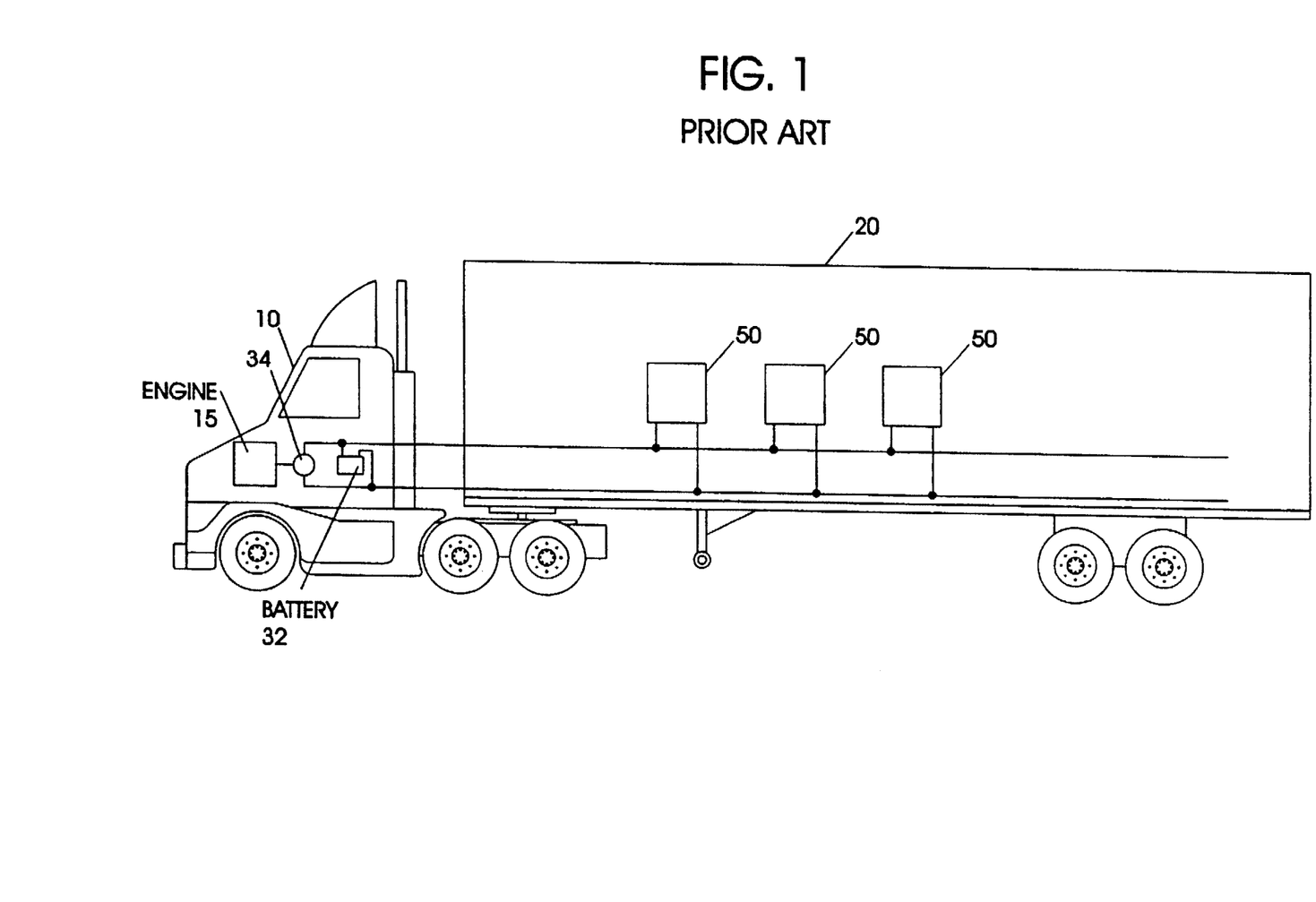
FIG. 1 is a schematic diagram illustrating a tractor/trailer vehicle according to the prior art.

The trucking industry has for many years used tractor/trailer combinations to transport cargo over the roadways to intended destinations. As shown in FIG. 1, a tractor 10 and a trailer 20 are mechanically coupled together so that the tractor can pull the trailer with its cargo in an efficient and cost-effective manner using mechanical energy provided by a tractor engine 15 located on the tractor 10. A tractor/trailer combination typically also includes numerous electrical subsystems 50 located on the tractor or the trailer which utilize electrical energy provided by a battery 32. The construction of the battery 32 is well-known, conventionally including a plurality of serially-connected rechargeable lead-acid secondary cells (not shown), each including plate-like electrodes (not shown) immersed in an acidic electrolyte solution (not shown). The battery 32 typically is charged by an alternator 34 mechanically driven by the tractor engine 15.

Figure 2:
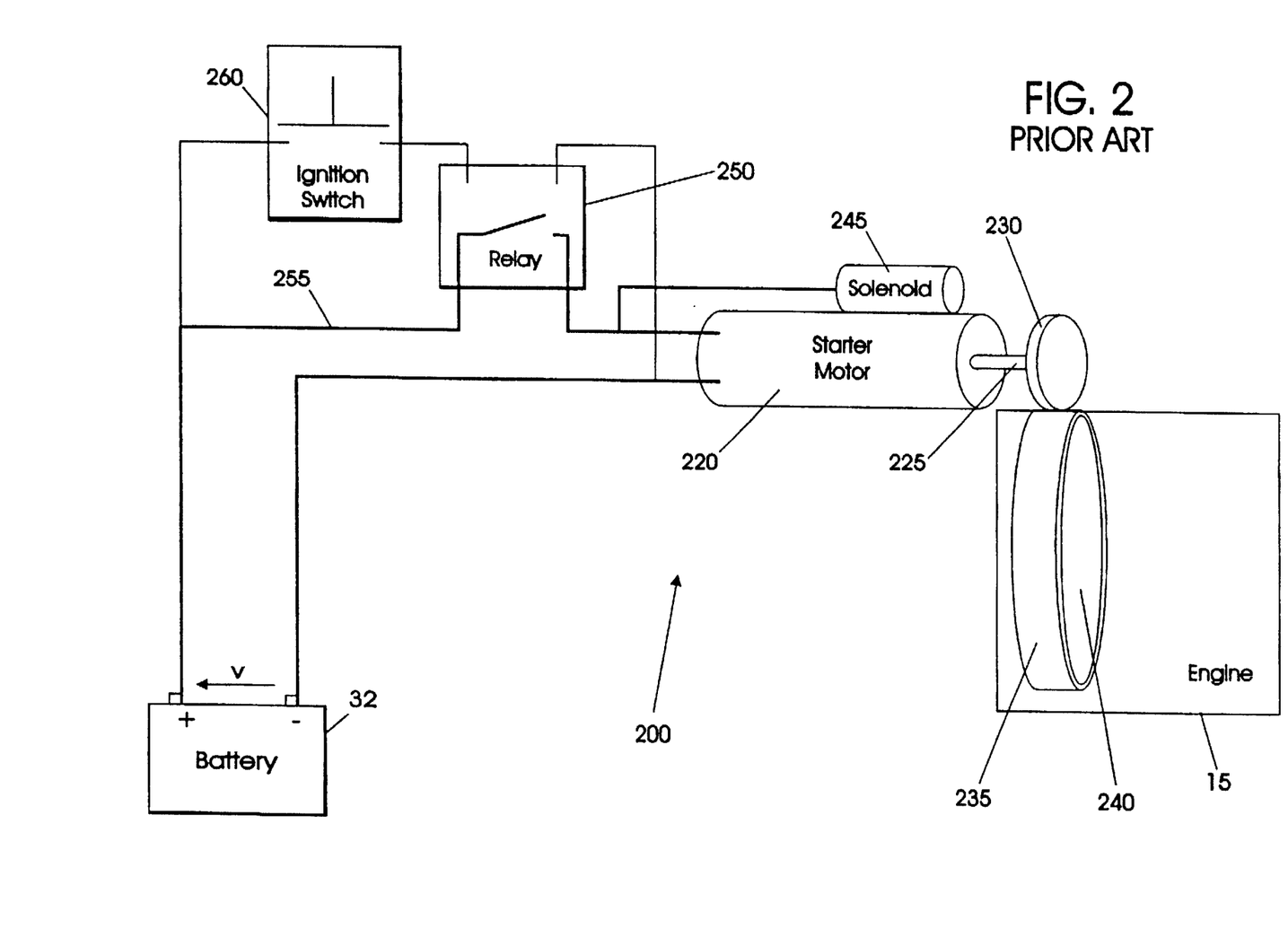
FIG. 2 is a schematic diagram illustrating a vehicle cranking system according to the prior art.

The electrical subsystems 50 of a vehicle include a cranking system 200, which is used to start the tractor engine 15, such as illustrated in FIG. 2. In addition to the battery 32, the cranking system 200 includes a starter 210 which conventionally has a starter motor 220, an output shaft 225, a pinion gear 230 connected to the output shaft 225, a ring gear 235 connected to the engine flywheel 240, and a starter solenoid 245, a magnetically-operated actuator which causes the pinion gear 230 to engage the ring gear 235 when the starter solenoid 245 is energized. When engaged and energized, the starter motor 220 turns the pinion gear 235 transferring mechanical energy to the flywheel 240 and turning the engine 15. The starter motor 220 conventionally is engaged and energized through a relay 250 which closes a high current capacity starter circuit 255 running from the battery to the starter motor 220 and the starter solenoid 245. The relay 250 conventionally is actuated by a switched circuit connected to the battery 32 through a manually operated ignition switch 260. The ignition switch 260 conventionally includes momentary pushbutton or similar switch.

Extended continuous cranking tends to accelerate starter wear by overheating the starter motor 220 and increasing wear at the pinion-ring gear mesh, while placing extraordinary demands on the battery 32. A conventional starter motor 220 may draw several amperes, a load that, if maintained, will quickly discharge even the highest capacity battery and tend to degrade its overall performance. As those skilled in the art will understand, high current densities in a battery 32 tend to localize the chemical reactions which produce electrical current in the battery 32 at the surface of the battery's electrode plates, clogging the surface pores of the plates with sulfate deposits and preventing diffusion of the battery electrolyte deeper into the plates. The overall effect of this sulfating is to accelerate the reduction of the available capacity of the battery 32 if the high current density is continuously maintained. The available capacity of the battery 32 may be restored to some degree by allowing a recovery time after a high current discharge giving the battery electrolyte sufficient time to diffuse into the battery plates. Thus, some operators may attempt to manually operate the cranking system 200 in short, intermittent bursts to reduce battery sulfation, to allow the battery 32 to rebound after the high-current discharge involved in starting, and to protect the starter 210 and associated gears. Operators who are unaware of the deleterious effects of extended cranking on a cranking system 200, however, may crank an engine 15 for an extremely long period, thereby further reducing the probability of successfully starting the engine 15.

In addition to the cranking system 200, electrical subsystems 50 of tractor/trailers increasingly include a number of electrical accessories such as communication systems, audio systems, video systems, microwave ovens, refrigerators, electric heaters, and the like. The presence of these additional accessories creates a higher demand for energy from the battery 32 competing with the cranking system 200. In particular, these accessories tend to deplete the energy available for starting when they are operated with the engine 15 stopped and the alternator inactive. For example, if these accessories are left in operation overnight while the engine 15 is stopped, they may draw the battery 32 down to such a level that insufficient electrical energy is available to start the engine on a cold morning, when the viscosity of the engine oil increases the engine's mechanical resistance and higher electrolyte viscosity reduces the battery's available capacity.

Frequent deep discharging of a truck's battery 32 may increase the overall unreliability of the cranking system 200. Besides increasing the number of "no starts" and the resulting negative effects on delivery schedules, frequent deep discharging and subsequent recharging of the battery 32—referred to as "deep cycling"—generally reduces battery life by causing accelerated plate deterioration and outgassing of electrolyte. Frequent deep cycling may also reduce alternator life, as the alternator is required to serve greater duty charging the battery 32. A traditional way to avoid deep cycling is to leave the tractor's engine running continuously so that the tractor's alternator provides the electrical energy consumed by the electrical accessories. Excessive "idling time," however, is not desirable because of the increased fuel consumption and pollution involved. Moreover, extended idling with accessory loads connected increases alternator wear leading to more frequent alternator failure and indirectly reducing cranking system reliability by depriving the battery 32 of a reliable recharging source.

If a tractor's engine 15 is shut down to save fuel and prevent engine and alternator wear, however, the operator cannot be depended upon to disconnect accessories from the battery 32 to prevent deep discharge of the battery 32. The operator may forget to disconnect unused accessories or may be reluctant to disconnect creature comforts after a long day on the road. In addition, the operator may not be aware of all of the parasitic loads on the tractor/trailer 20 which may be depleting the truck's battery 32, and thus may inadvertently allow the battery 32 to become discharged.

In addition to being dependent on a reliable source of energy, the cranking system's mechanical elements may be easily damaged. Because of the relative fragility of the pinion and ring gears 230, 235 and the tremendous torque which may be exerted by the flywheel and starter motor 220, the cranking system 200 may be damaged when the starter motor 220 is energized with the flywheel in motion, e.g., when the operator attempts to start the engine 15 when the engine 15 is already running or when the flywheel is still in motion from a previous cranking attempt. The starter pinion gear 230 may be damaged or even stripped, necessitating replacement of the starter 210. Worse, the ring gear 235 may develop "dead spots" which may ultimately require replacement of the ring gear 235. This repair may involve a costly and time-consuming tear-down of the tractor engine 15, incapacitating the tractor for an extended period of time.

OBJECTS AND SUMMARY OF THE INVENTION

In the light of the foregoing, it is an object of the present invention to provide systems and methods for cranking system management which increase cranking system reliability.

It is another object of the present invention to provide systems and methods for cranking system management which prevent deep discharge of the battery which provides electrical energy to the cranking system.

It is also an object of the present invention to provide systems and methods for cranking system management which prevent extended high-current discharges of the battery.

It is yet another object of the present invention to provide systems and methods for cranking system management which prevent damage to cranking system mechanical components.

These objects, advantages, and features are provided by systems and methods for managing a vehicle cranking system in which accessory energy transfer control means enables transfer of electrical energy from the cranking system battery to an electrical accessory load when the output voltage of the battery is above a first predetermined voltage threshold, and inhibits transfer of electrical energy from the battery to an electrical accessory load when the output voltage of the battery is below a second predetermined voltage threshold. The second predetermined voltage threshold preferably is a voltage level that indicates that the battery has sufficient energy stored to start the vehicle's engine. Cranking energy control means enables transfer of electrical energy from the battery to a starter which cranks the vehicle's engine if a cranking command is asserted for less than a first predetermined time interval, and inhibits transfer of electrical energy from the battery to the starter for a second predetermined time interval if a command is continuously asserted for longer than the first predetermined time interval. The cranking energy control means may also inhibit transfer of electrical energy from the battery to the starter if an engine speed sensed by speed sensing means is greater than a predetermined threshold speed.

The present invention thus provides protection for the cranking system, including the battery and starter. Inhibiting transfer of electrical energy to accessory loads when the battery voltage drops to low levels prevents deep discharge of the battery, preserves starting capacity and reduces the need for recharging. This reduces the occurrence of "no starts" which lead to missed loads and delivery delays, and prevents deep cycling which may reduce the life of the battery and alternator. Preventing extended high current discharge by avoiding extended cranking can prevent accelerated surface sulfating of battery plates and also increase starter life. Providing for a "timeout" after cranking allows the battery to recover and provide more energy for subsequent starting attempts. Inhibiting the cranking system when the engine is rotating faster than a predetermined speed protects the starter and pinion and ring gears, thereby helping reduce wear and cutting down on costly and time-consuming repairs. By incorporating these aspects in whole or in part, the present invention can provide increased overall cranking system reliability and operational life.

In particular, according to one aspect of the present invention, a vehicle includes a combination of tractor and a trailer mechanically connected to the tractor. An engine positioned on the tractor provides mechanical energy to propel the tractor/trailer combination. Cranking command asserting means assert a command signal to crank the engine, and engine cranking means operatively connected to the engine to crank the engine in response to an asserted command signal. A battery producing a battery output voltage signal supplies energy to the engine cranking means in order to crank the engine. Accessory energy transfer control means electrically connected to the battery and to an electrical accessory load enables transfer of electrical energy from the battery to the electrical accessory load when the battery output voltage signal is above a first predetermined voltage threshold and inhibits transfer of electrical energy from the battery to the electrical accessory load when the battery output voltage signal is below a second predetermined voltage threshold, thereby conserving energy electrical energy stored within the battery. The first and second predetermined voltage thresholds may be the same, or may be different in order to provide hysteresis. The vehicle may also include temperature sensing means which senses a temperature of the vehicle engine, preferably engine oil temperature sensing means for sensing the temperature of oil present in the engine, and the accessory energy transfer control means may include voltage threshold determining means for determining the first and second voltage thresholds based on the sensed temperature. The vehicle may further include speed sensing means which senses a rotational speed of the engine and the cranking energy transfer control means may include means for inhibiting the transfer of electrical energy from the battery to the engine cranking means when the sensed engine speed exceeds a predetermined threshold speed.

According to a method aspect of the invention, electrical energy is enabled to be transferred from a vehicle battery to an electrical accessory load when the battery output voltage signal is above a first predetermined voltage threshold, but electrical energy is inhibited from transferring from the battery to the electrical accessory load when the battery output voltage signal is below a second predetermined voltage threshold. The vehicle may include a temperature sensor which senses a temperature of the vehicle engine, and the first and second predetermined voltage thresholds may be determined based on the sensed engine temperature. Preferably, the temperature sensor includes an engine oil temperature sensor which senses a temperature of oil present within the vehicle engine and the first and second predetermined voltage thresholds are determined based on the sensed engine oil temperature. The vehicle also may include a speed sensor which senses the rotational speed of the engine, and electrical energy may be inhibited from transferring from the battery to the starter if the sensed rotational speed of the engine is greater than a predetermined threshold speed to thereby inhibit cranking of the engine when the engine is rotating.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

Figure 3:
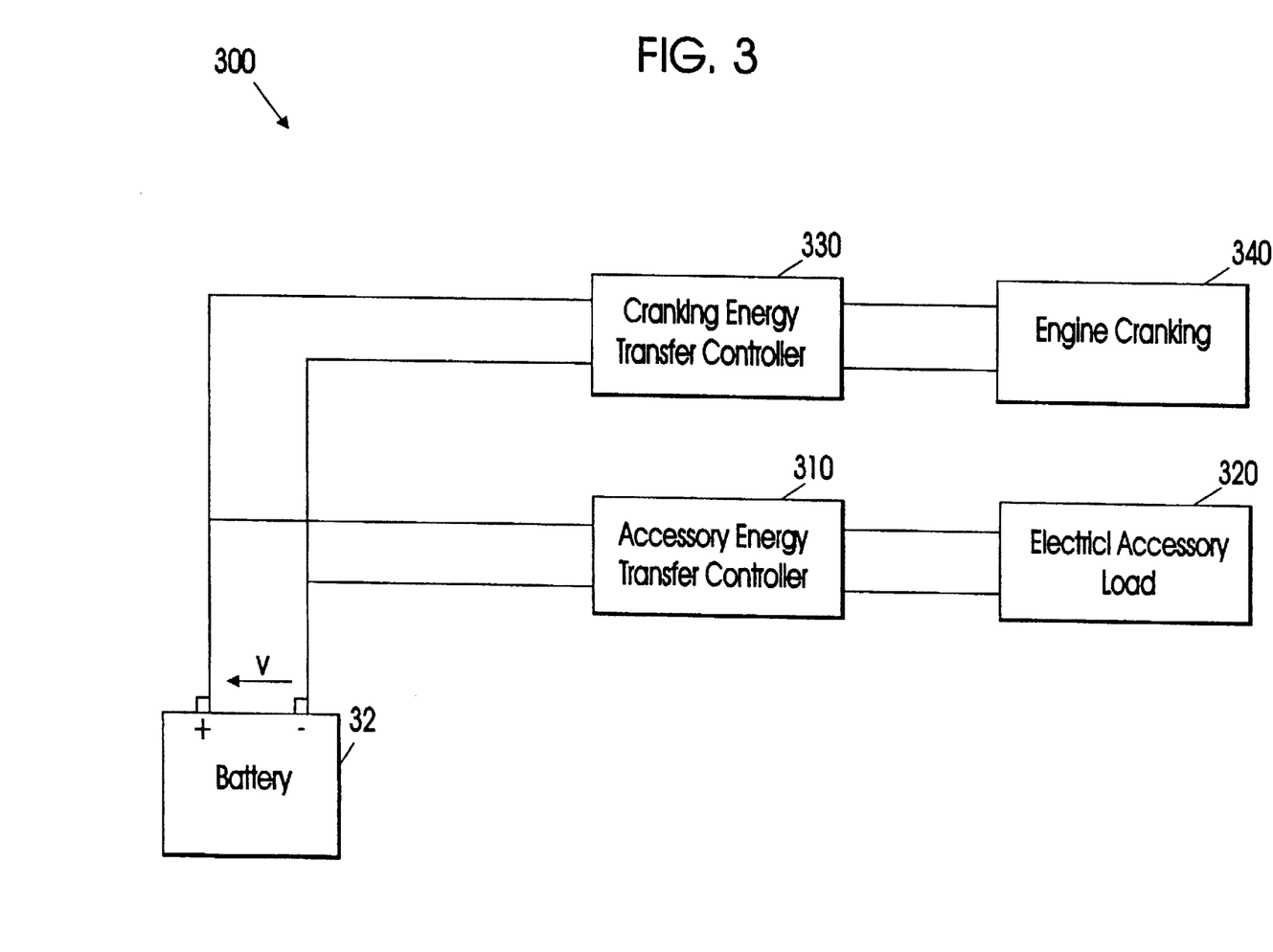
FIG. 3 is a schematic diagram illustrating a cranking system management system according to the present invention.

FIG. 3 is a schematic block diagram illustrating a cranking system management system 300 for a vehicle as used, for example, on a combination of a tractor and a trailer mechanically coupled to the tractor according to the present invention. The cranking management system 300 includes accessory energy transfer control means 310, which controls transfer of electrical energy from the battery 32 to an electrical accessory load 320 responsive to a battery output voltage signal V. The cranking system management system 300 also includes cranking energy transfer control means 330, which controls transfer of electrical energy from the battery to engine cranking means 340 for cranking the engine.

Figure 4:
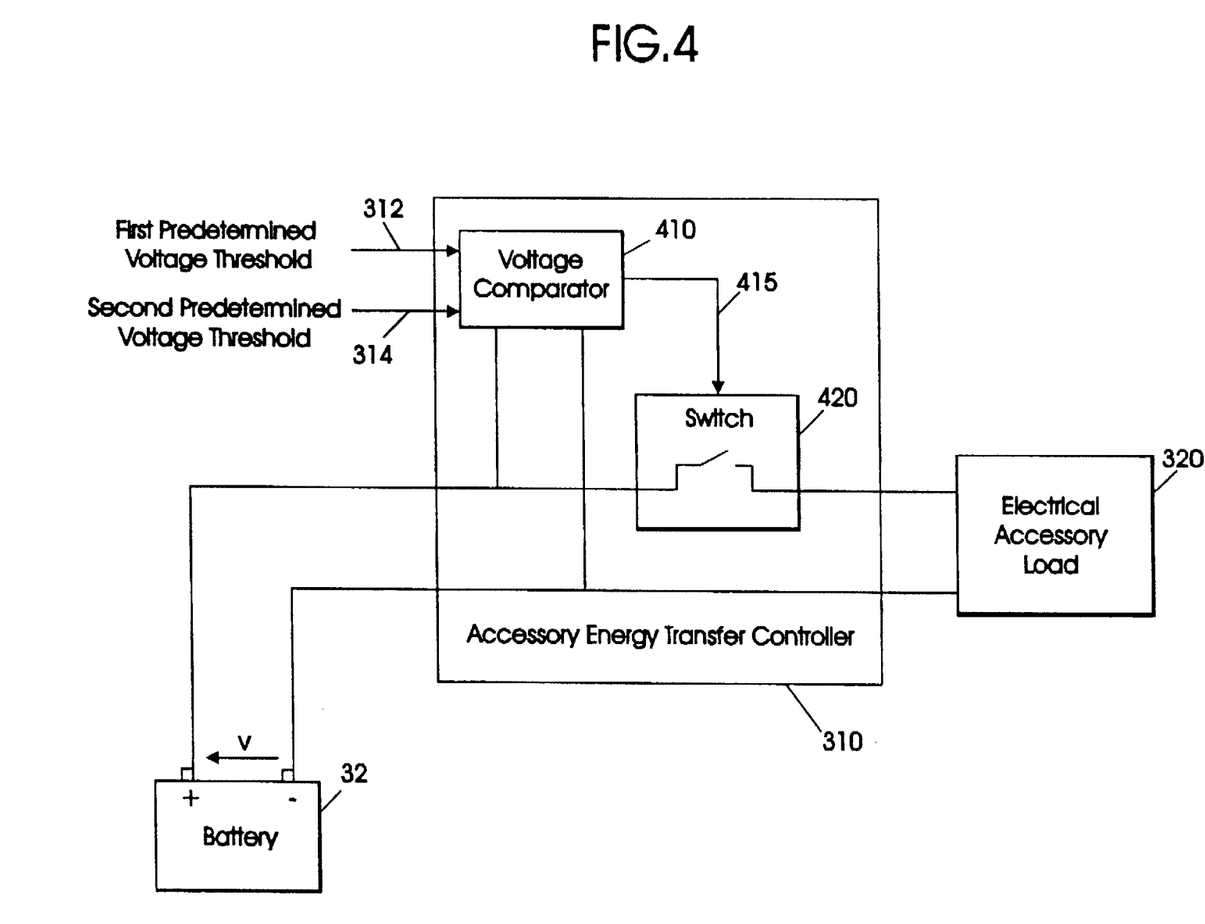
FIG. 4 is a schematic diagram illustrating control of the transfer of electrical energy to an electrical accessory load according to the present invention.

As illustrated in FIG. 4, the accessory energy transfer control means 310 enables transfer of electrical energy to the electrical accessory load 320 if the battery output voltage signal V is above a first predetermined voltage threshold 312, and inhibits transfer of electrical energy to the electrical accessory load if the battery output voltage signal is below a second predetermined threshold voltage 314. In the exemplary embodiment of FIG. 4, the accessory energy transfer control means 310 preferably includes a voltage comparator 410 which compares the battery output voltage signal V to the first and second predetermined voltage thresholds 312, 314, providing a command signal 415 to switching means 420 to open or close an electrical accessory circuit 425 based on the voltage comparison. Techniques for implementing the voltage comparator 410 and switching means 420 are well-known to those skilled in the art, and need not be discussed in detail herein. Those skilled in the art will understand, for example, that the voltage comparator 410 may include an analog circuit, a digital circuit or a combination thereof, which generates a digital or analog signal which commands the switching means 420. Those skilled in the art will also understand that the voltage comparator 410 may also include software operating in a microprocessor or other computer which monitors the battery output voltage signal V and provides a command 415 to the switching means 420. Those skilled in the art will understand that the switching means 420 may include, for example, switching devices such as electromagnetic or solid-state relays, switching transistors and the like. Those skilled in the art will further understand that although the first predetermined threshold voltage 312 and the second predetermined threshold voltage 314 may have the same value, the threshold voltages may have different values in order to provide hysteresis for accessory energy transfer control means 310, and thus prevent oscillation.

Figure 8:
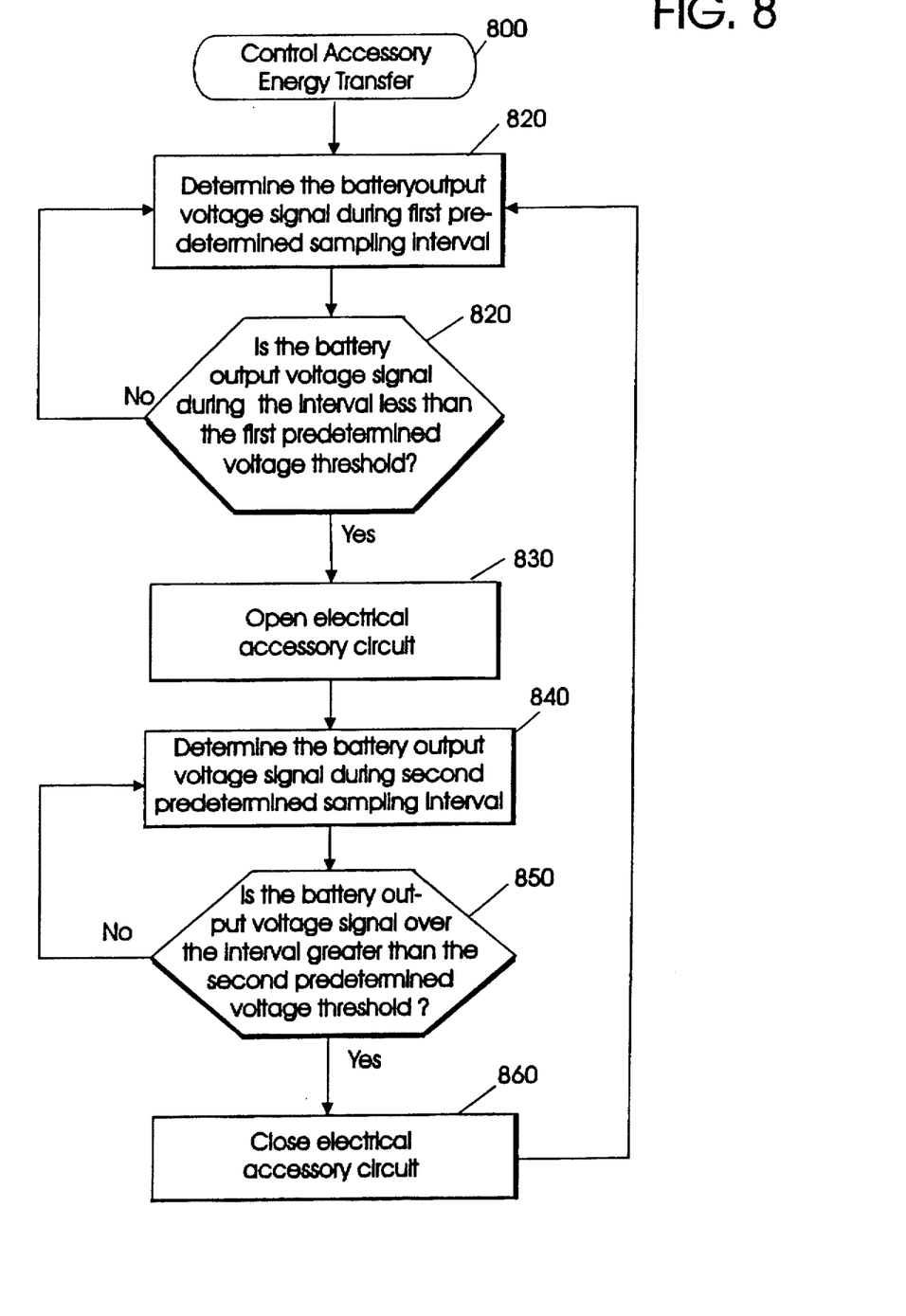
FIG. 8 is a flowchart diagram illustrating operation for controlling transfer of electrical energy to an electrical accessory load according to the present invention.

Those skilled in the art will also understand that hysteresis may also be provided by comparing an average or other cumulative version of battery output voltage signal V over an arbitrary sampling interval to the first and second predetermined threshold voltages 312, 314, as illustrated in FIG. 8 (Block 800). Assuming the electrical accessory circuit is closed at Block 800, the battery output voltage signal is determined over a first predetermined sampling interval (Block 810). If the battery output voltage signal is greater than the second predetermined threshold value, the electrical accessory circuit remains closed and the battery output voltage signal is determined over a succeeding first predetermined sampling interval (Block 820). If, however, the battery output voltage signal is below the second predetermined threshold voltage, the electrical accessory circuit is opened to inhibit transfer of electrical energy from the battery to the electrical accessory load (Block 830). The battery output voltage signal is then monitored over a second predetermined sampling interval (Block 840), and the electrical accessory circuit is maintained in an open state if the battery output voltage signal remains less than the first predetermined threshold voltage over successive second predetermined sampling intervals (Block 850). If the battery output voltage signal over one of the second predetermined sampling intervals exceeds the first predetermined threshold voltage, however, the electrical accessory circuit is closed, enabling electrical energy to transfer from the battery to the electrical accessory load (Block 860). Those skilled in the art will understand that operations for the accessory energy transfer control means 310 are not limited to operations of FIG. 8, however. For example, different or additional sampling periods, waiting periods and other operations may be included along with the operations of FIG. 8.

Figure 5:
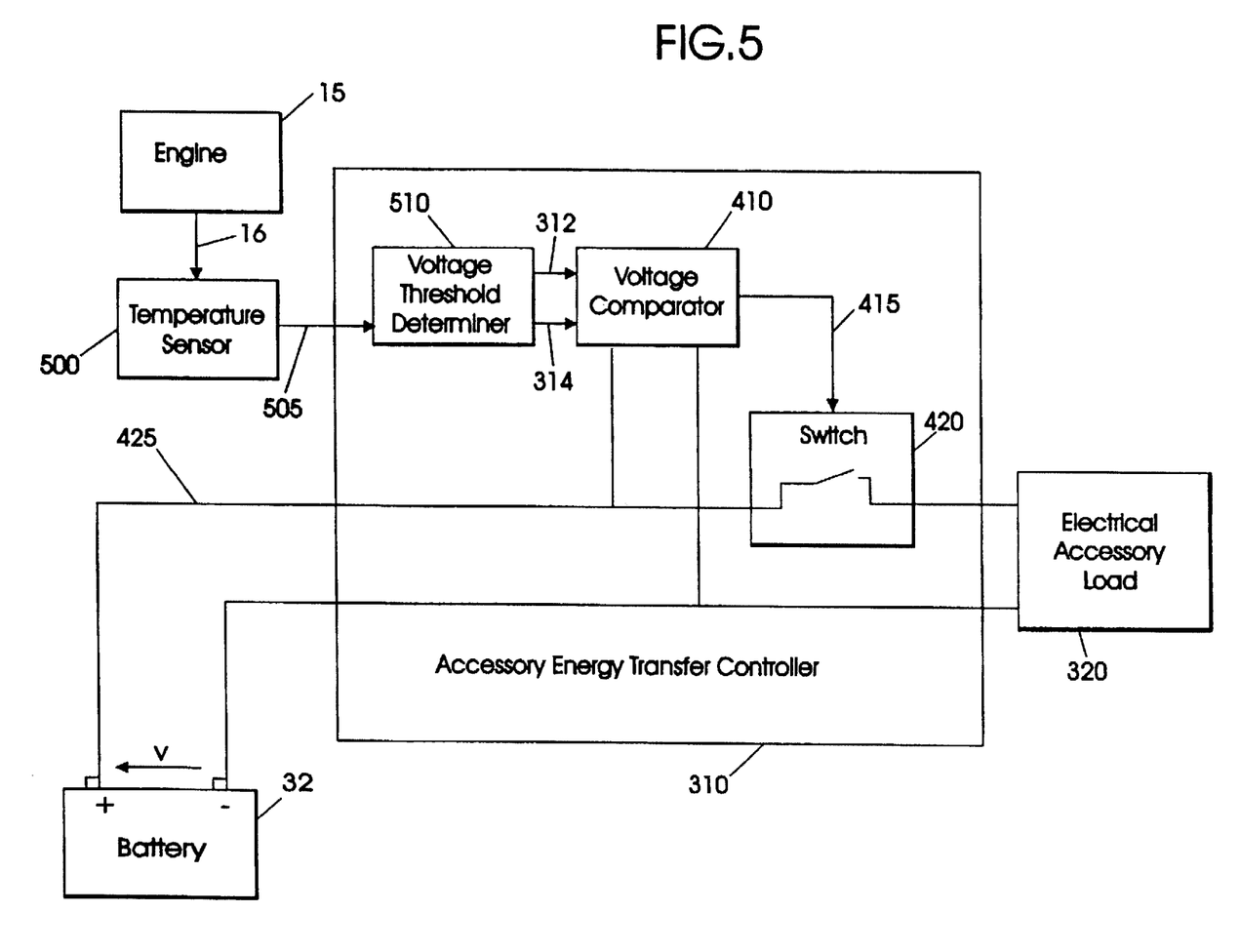
FIG. 5 is a schematic diagram illustrating control of the transfer of electrical energy to an electrical accessory load based on a tractor/trailer temperature according to the present invention.

As illustrated in FIG. 5, the vehicle may also include a temperature sensing means 500 which senses a temperature of the vehicle engine, such as a thermocouple or other temperature sensing device mounted on the engine which is in fluid contact with the engine or a fluid present in the engine, such as coolant or oil. The accessory energy transfer control means 310 preferably includes voltage threshold determining means 510 which determines the first and second predetermined threshold voltages 312, 314 based on the sensed temperature 505. Preferably, the temperature sensing means 500 senses a temperature 501 of engine oil present in the engine 15, and includes a SAE J1708 serial data communications bus which communicates the sensed temperature to the accessory energy transfer control means 310. By determining the predetermined threshold voltages 312,314 using a sensed engine oil temperature, accessory energy transfer control means 310 may control the transfer of electrical energy to the electrical accessory load 320 in relation to the mechanical load for the cranking system and the available capacity of the battery 32, and may take advantage of a sensor signal which is commonly provided on a standardized vehicle instrumentation bus.

Figure 6:
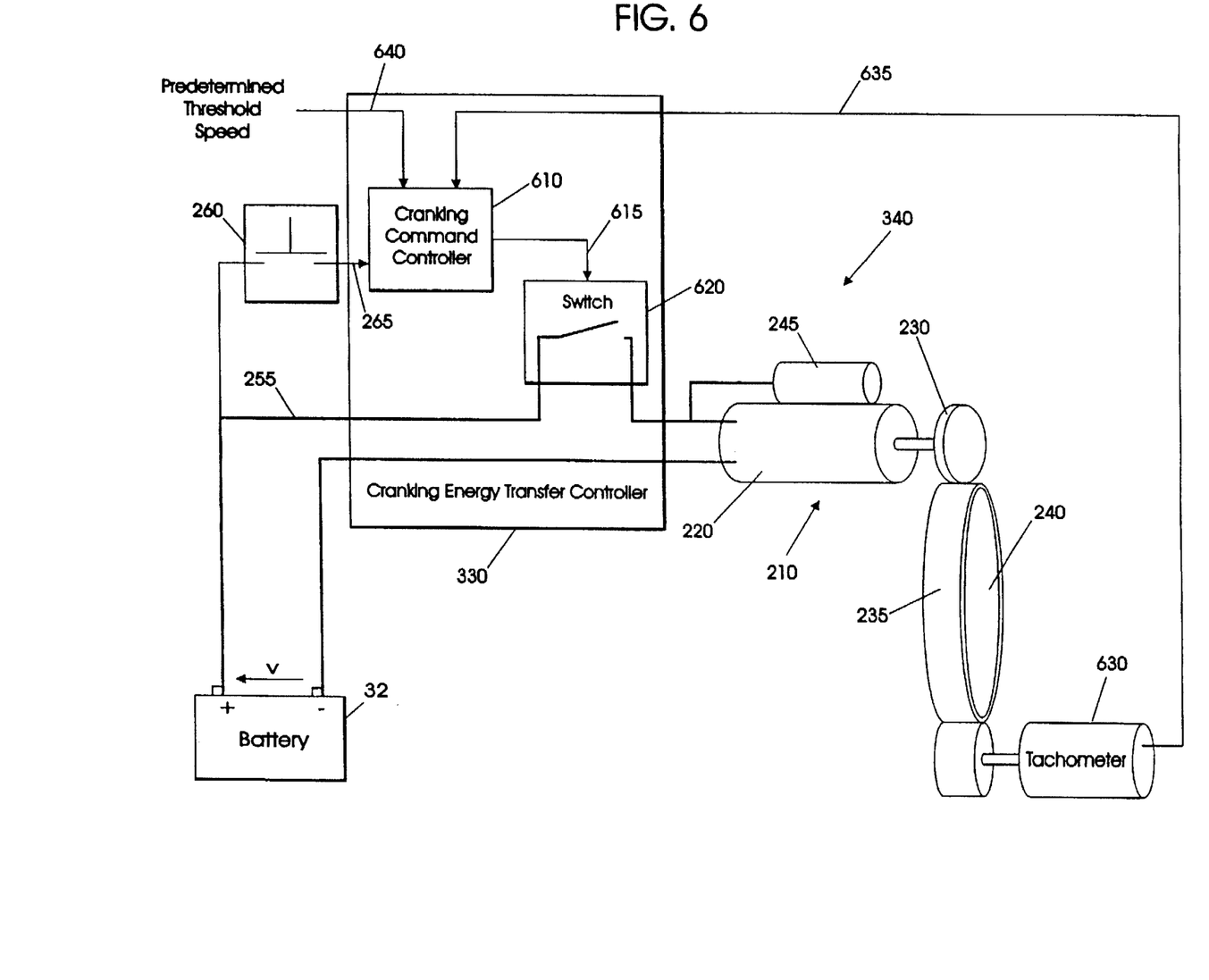
FIG. 6 is a schematic diagram illustrating control of the transfer of electrical energy to a tractor/trailer cranking system according to the present invention.

As best illustrated in FIG. 6, the cranking system management system 300 may also include cranking energy control transfer means 330, which controls the transfer of electrical energy to cranking means 340, preferably including a starter 210 which includes a starter motor 220, a starter solenoid 245, and associated pinion and ring gears 230, 235. Electrical energy is enabled to transfer from the battery 32 to the starter motor 220 and the starter solenoid 245, based on a cranking command input signal 265 from cranking command asserting means 260, preferably including an ignition switch. The vehicle may also include speed sensing means for sensing a rotational speed of the engine 15. For example, the speed sensing means preferably is a tachometer 630 which senses the rotational speed of the engine flywheel 240 to the sensed engine speed 635 supplied to the cranking energy transfer control means 330.

Cranking energy transfer control means 330 enables the transfer of electrical energy from the battery 32 to the engine cranking means 340 if a command 265 to crank the engine 15 is asserted for a period less than a first predetermined time interval. If a command to crank the engine is continuously asserted for a period greater than the first predetermined time interval, however, the cranking energy transfer control means 330 inhibits the transfer of electrical energy from the battery 32 to the engine cranking means 340 for a second predetermined time interval, inhibiting cranking of the engine 15 during the second predetermined time interval.

For example, as illustrated in FIG. 6, the cranking energy transfer control means 330 preferably includes a cranking command controller 610 into which a cranking command signal 265 is received from an ignition switch 260. Based on the length of time the command is asserted, the controller 610 provides a command signal 615 to a switch 620, such as a relay, thus opening or closing a starter circuit 640 which carries electrical energy from the battery 32 to the starter motor 220 and the starter solenoid 245.

Figure 7:
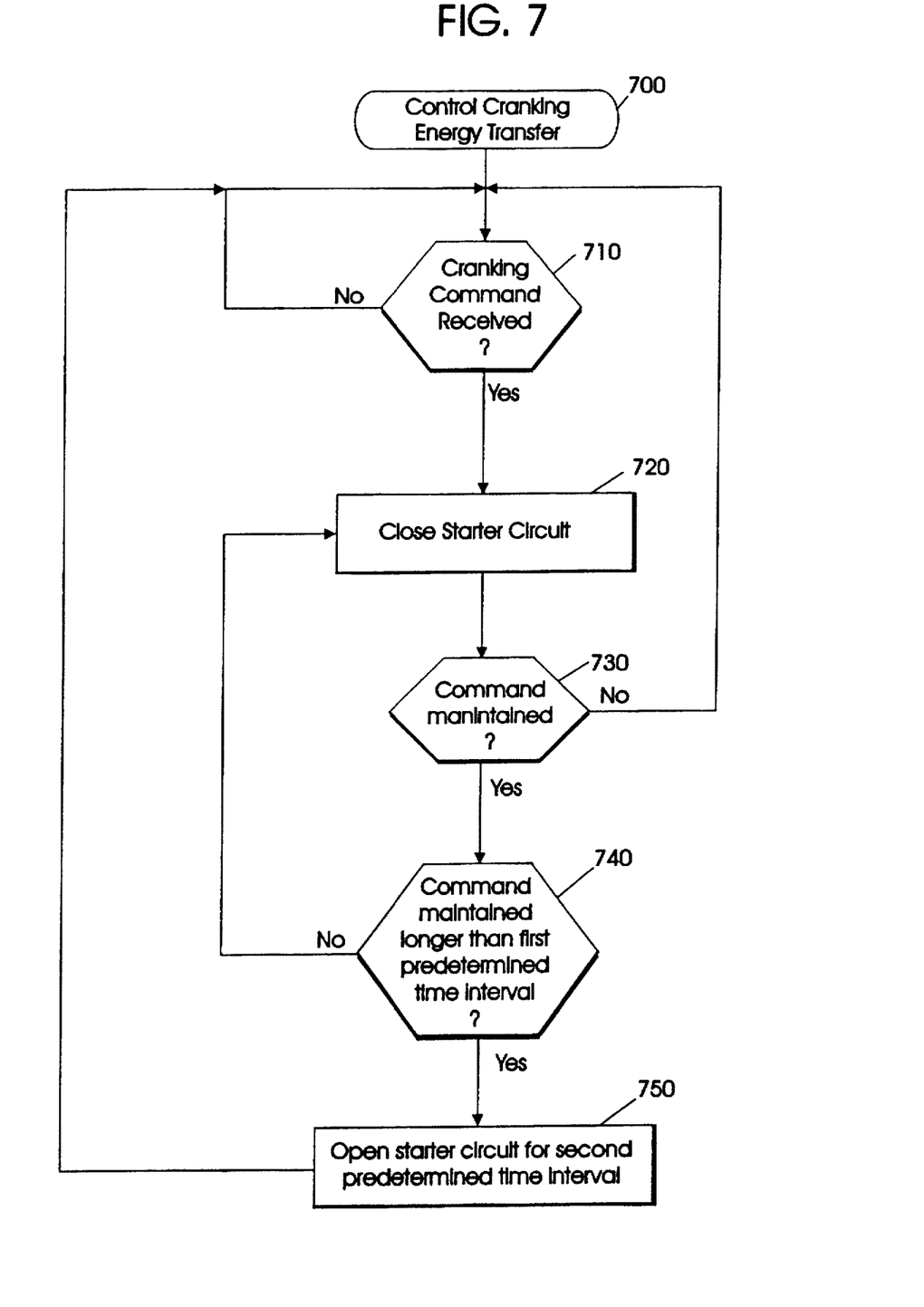
FIG. 7 is a flowchart diagram illustrating operations for controlling the transfer of electrical energy to a tractor/trailer cranking system according to the present invention.

Operations which are preferably performed by the cranking command controller 610 are illustrated in FIG. 7 (Block 700). Upon receipt of a command signal to crank the engine (Block 710), the cranking command controller 610 causes the starter relay 620 to close the starter circuit (Block 720), energizing the starter motor 220 and starter solenoid 245 and cranking the engine 15. If the command signal continues to be asserted (Block 730), and is continuously asserted for less than the first predetermined time interval (Block 740), the starter circuit is maintained in a closed state, cranking the engine 15 (Block 720). If, however, a command signal is asserted for a period longer than the first predetermined time interval (Block 740), the cranking command controller 610 causes the starter relay 620 to open the starter circuit, and maintains the starter circuit in an open state during the second predetermined time interval to inhibit cranking of the engine 15 during the second predetermined time interval (Block 750). After the end of the second predetermined interval, the starter circuit may again respond to a cranking command.

The cranking command controller 610 of FIG. 6 may also inhibit the transfer of electrical energy from the battery 32 to the engine cranking means 340 if the sensed rotational speed 635 of the engine 15 exceeds a predetermined threshold speed 650, thus inhibiting cranking of the engine 15 when the engine is rotating. Those skilled in the art will understand that although a threshold speed of zero may be desirable, the tachometer 630 typically may supply a voltage signal approximately proportional to the speed of the engine 15, and this voltage signal may have a noise floor which yields a sensed engine speed greater than zero even when the engine 15 is actually at rest. In addition, it may be desirable to enable the engine 15 to be cranked even if it is rotating at a minimal speed, if that speed poses little threat of damaging cranking system components should the cranking system 340 be operated. Therefore, those skilled in the art will understand that according to the present invention, the predetermined threshold speed may be set such that the engine 15 cannot be cranked if the engine speed exceeds this minimal speed and/or the noise envelope.

In the drawings and specification, there has been disclosed preferred embodiments of the invention, and, although specific terms are employed, the terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. A vehicle comprising:
   a tractor adapted for mechanically connecting to a trailer;
   an engine operatively connected to the tractor and having one of an active state or an inactive state, said engine producing mechanical energy to propel said tractor in said active state;
   engine cranking means operatively connected to said engine for cranking said engine;
   a battery mounted on said tractor to supply electrical energy to said engine cranking means, said battery operatively providing a battery output voltage signal;
   means, responsive to said battery output voltage, for allowing transfer of electrical energy from said battery to an electrical accessory load while said engine is in said inactive state and sufficient energy remains in said battery to crank said engine to produce said active state, wherein said means comprises accessory energy transfer control means electrically connected to said battery and to said electrical accessory load for enabling transfer of electrical energy from said battery to said electrical accessory load when said battery output voltage signal is above a first predetermined voltage threshold and for inhibiting transfer of electrical energy from said battery to said electrical accessory load when said battery output voltage signal is below a second predetermined voltage threshold selected such that sufficient energy is conserved within said battery to crank said engine to produce said active state in said engine; and
   temperature sensing means operatively connected to said engine for sensing a temperature of said engine and wherein said accessory energy transfer control means comprises voltage threshold determining means responsive to said temperature sensing means for determining said first and second predetermined voltage thresholds responsive to the sensed engine temperature.

2. A vehicle according to claim 1 wherein said first and second voltage thresholds are the same.

3. A vehicle according to claim 1:
   including temperature sensing means which comprises an engine oil temperature sensor which senses a temperature of oil present within said engine; and
   wherein said voltage threshold determining means determines said first and second predetermined voltage thresholds responsive to the sensed engine oil temperature.

4. A vehicle according to claim 1 including temperature sensing means which comprises a SAE J1708 communications bus electrically connected to said voltage threshold determining means for communicating the sensed engine oil temperature to said voltage threshold determining means.

5. A vehicle according to claim 1, further comprising:

cranking energy transfer control means responsive to a user command which is continuously asserted by a user for a period greater than a first predetermined time interval for inhibiting transfer of electrical energy from said battery to said engine cranking means during a second predetermined time interval following said first predetermined time interval to thereby inhibit cranking of said engine during said second predetermined time interval notwithstanding continued assertion of the user command to crank the engine.

6. A vehicle according to claim 5, further comprising speed sensing means operatively connected to said engine for sensing a rotational speed of said engine, and wherein said cranking energy transfer control means comprises means responsive to said speed sensing means for inhibiting transfer of electrical energy from said battery to said engine cranking means when the sensed rotational speed of said engine is greater than a predetermined threshold speed.

7. A vehicle according to claim 6:

wherein said means for allowing transfer of electrical energy comprises a microprocessor; and wherein said cranking energy transfer control means comprises a microprocessor.

8. A vehicle according to claim 1, further comprising:

cranking command asserting means electrically connected to said engine cranking means for asserting a cranking command signal to said engine cranking means to thereby responsively crank said engine;

speed sensing means operatively connected to said engine for sensing the rotational speed of said engine; and cranking energy transfer control means responsive to said command asserting means and to said speed sensing means for enabling transfer of electrical energy from said battery to said engine cranking means when a cranking command signal is asserted and the sensed engine speed is less than a predetermined threshold speed and for inhibiting transfer of electrical energy from said battery to said engine cranking means when the sensed rotational speed of said engine is greater than said predetermined threshold speed.

9. A vehicle according to claim 1 wherein said accessory energy transfer control means comprises a microprocessor.

10. A vehicle comprising:

a tractor adapted for mechanically connecting to a trailer;

an engine operatively connected to the tractor and having one of an active state or an inactive state, said engine producing mechanical energy to propel the tractor in said active state;

engine cranking means operatively connected to said engine for cranking said engine;

a battery mounted on said tractor to supply electrical energy to said engine cranking means, said battery providing a battery output voltage signal;

cranking energy transfer control means responsive to a user command continuously asserted by a user for a period greater than a first predetermined time interval for inhibiting transfer of electrical energy from said battery to said engine cranking means during a second predetermined time interval following said first predetermined time interval to thereby inhibit cranking of said engine during said second predetermined time interval notwithstanding continued assertion of the user command to crank the engine.

11. A vehicle according to claim 10, further comprising speed sensing means operatively connected to said engine for sensing the rotational speed of said engine and wherein said cranking energy transfer control means comprises means responsive to said speed sensing means for inhibiting transfer of electrical energy from said battery to said engine cranking means when the sensed rotational speed of said engine is greater than a predetermined threshold speed.

12. A vehicle according to claim 10 wherein said cranking energy transfer control means comprises a microprocessor.

13. A cranking system management system for a vehicle, the vehicle including a tractor adapted for mechanically connecting to a trailer, an engine operatively connected to the tractor and having one of an active state or an inactive state, the engine producing mechanical energy to propel the tractor in said active state, and a battery which supplies electrical energy to the starter, the battery providing a battery output voltage signal, the management system comprising:

an accessory energy transfer controller which allows transfer of electrical energy from the battery to an electrical accessory load while the engine is in the inactive state and sufficient energy remains in the battery to crank the engine to produce the active state, wherein said accessory energy transfer controller is electrically connected to the battery and an electrical accessory load, enables transfer of electrical energy from the battery to the electrical accessory load when the battery output voltage signal is above a first predetermined threshold voltage, and inhibits transfer of electrical energy from the battery to the electrical accessory load when the battery output voltage signal is below a second predetermined voltage threshold selected such that sufficient energy is conserved within said battery to rank said engine to produce said active state in said engine; and a temperature sensor operatively connected to the engine which senses a temperature of the engine, and wherein said accessory energy transfer controller comprises voltage threshold determining means responsive to the temperature sensor for determining said first and second predetermined voltage thresholds responsive to the sensed engine temperature.

14. A cranking system management system according to claim 13 wherein said first and second voltage thresholds are the same.

15. A cranking system management system according to claim 13 further comprising cranking energy transfer control means responsive to a user command which is asserted for a period greater than said first predetermined time interval for inhibiting transfer of electrical energy from the battery to the starter during a second predetermined time interval following said first predetermined time interval to thereby inhibit cranking of the engine during said second predetermined time interval notwithstanding continued assertion of the user command to crank the engine.

16. A cranking system management system according to claim 15, wherein the vehicle includes a speed sensor operatively connected to the engine which senses the rotational speed of the engine, and wherein said cranking energy transfer control means comprises means responsive to the speed sensor for inhibiting transfer of electrical energy from the battery to the starter when the sensed rotational speed of the engine is greater than a predetermined threshold speed.

17. A cranking system management system according to claim 16:

wherein said accessory energy transfer controller comprises a microprocessor; and wherein said cranking energy transfer control means comprises a microprocessor.

18. A cranking system management system according to claim 13 wherein the vehicle includes a speed sensor operatively connected to the engine which senses the rotational speed of the engine, and further comprising cranking energy transfer control means responsive to a user command and to the speed sensor for enabling transfer of electrical energy from the battery to the starter when a user command is asserted and the sensed engine speed is less than a predetermined threshold speed and for inhibiting transfer of electrical energy from the battery to the starter if the sensed rotational speed of the engine is greater than said predetermined threshold speed.

19. A cranking system management system according to claim 13 wherein said accessory energy transfer controller comprises a microprocessor.

20. A cranking system management system for a vehicle, the vehicle including a tractor adapted for mechanically connecting to a trailer, an engine positioned on the tractor which provides mechanical energy to propel the tractor, a starter operatively connected to the engine which is responsive to a user command asserted by a user to thereby crank the engine, and a battery which supplies electrical energy to the starter, the management system comprising:

a cranking energy transfer controller responsive to a user command which is continuously asserted by a user for a period greater than a first predetermined time interval to inhibit transfer of electrical energy from the battery to the starter during a second predetermined time interval following said first predetermined time interval to thereby inhibit cranking of the engine during said second predetermined time interval notwithstanding continued assertion of the user command to crank the engine.

21. A cranking system management system according to claim 20 wherein the vehicle includes a speed sensor operatively connected to the engine which senses the rotational speed of the engine and wherein said cranking energy transfer controller comprises means responsive to the speed sensor for inhibiting transfer of electrical energy from the battery to the starter when the sensed rotational speed of the engine is greater than a predetermined threshold speed.

22. A cranking system management system according to claim 21 wherein said cranking energy transfer control means comprises a microprocessor.

23. A method for managing a cranking system of a vehicle, the vehicle including a tractor adapted for mechanically connecting to a trailer, an engine operatively connected to the tractor and having one of an active state or an inactive state, the engine producing mechanical energy to propel the tractor in the active state, a starter operatively connected to the engine which is responsive to a user command asserted by a user to thereby responsively crank the engine, a battery which supplies electrical energy to the starter, the battery producing a battery output voltage signal, and a temperature sensor operatively connected to the engine which senses a temperature of the engine, the method comprising the steps of:

sensing the temperature of the engine;

determining first and second predetermined voltage thresholds in response to the sensed engine temperature;

responsive to the battery output voltage signal, allowing transfer of electrical energy from the battery to an electrical accessory load while said engine is in said inactive state and sufficient energy remains in said battery to crank said engine to produce said active state; and inhibiting the transfer of electrical energy from the battery to the electrical accessory load when the battery output voltage signal is below the second predetermined threshold voltage selected such that sufficient energy remains in the battery crank said engine to produce the active state in the engine.

24. A method according to claim 23, further comprising the step of inhibiting, in response to a user command which is continuously asserted by a user for a period greater than a first predetermined time interval, transfer of electrical energy from the battery to the starter during a second predetermined time interval following the first predetermined time interval to thereby inhibit cranking of the engine during the second predetermined time interval notwithstanding continued assertion of the user command to crank the engine.

25. A method according to claim 24, wherein the vehicle includes a speed sensor which senses the rotational speed of the engine, and further comprising the step of inhibiting transfer of electrical energy from the battery to the starter when the sensed rotational speed of the engine is greater than a predetermined threshold speed.

26. A method according to claim 23, wherein the vehicle includes a speed sensor which senses the rotational speed of the engine, and further comprising the step of inhibiting transfer of electrical energy from the battery to the starter when the sensed rotational speed of the engine is greater than a predetermined threshold speed.

27. A method for managing a cranking system of a vehicle, the vehicle including a tractor adapted for mechanically connecting to a trailer, an engine operatively connected to the tractor and having one of an active state or an inactive state, the engine producing mechanical energy to propel the tractor in the active state, a starter operatively connected to the engine and responsive to a user command asserted by a user to thereby responsively crank the engine, and a battery which supplies electrical energy to the starter, the method comprising the step of:

in response to a user command continuously asserted by a user for a period greater than a first predetermined time interval, inhibiting the transfer of electrical energy from the battery to the starter during a second predetermined time interval following the first predetermined time interval to thereby inhibit cranking of the engine during the second predetermined time interval notwithstanding continued assertion of the user command to crank the engine.

28. A method according to claim 27, wherein the vehicle includes a speed sensor operatively connected to the engine which senses a rotational speed of the engine and further comprising the step of inhibiting the transfer of electrical energy from the battery to the starter when the sensed rotational speed of the engine is greater than a predetermined threshold speed.

29. A method for managing a cranking system of a vehicle, the vehicle including a tractor adapted for mechanically connecting to a trailer, an engine operatively connected to the tractor and having one of an active state or an inactive state, the engine producing mechanical energy to propel the tractor in the active state, a starter operatively connected to the engine and responsive to a user command asserted by a user to thereby responsively crank the engine, and a battery which supplies electrical energy to the starter, the method comprising the step of:

in response to a user command continuously asserted by a user for a period greater than a first predetermined time interval, inhibiting the transfer of electrical energy from the battery to the starter during a second predetermined time interval following the first predetermined time interval to thereby inhibit the engine from being cranked during the second predetermined time interval notwithstanding continued assertion of the user command to crank the engine.

* * * * *

UNITED STATES PATENT AND TRADEMARK OFFICE
CERTIFICATE OF CORRECTION

PATENT NO.   :   5,798,577
DATED        :   August 25, 1998
INVENTOR(S)  :   Lesesky et al.

It is certified that error appears in the above-identified patent and that said Letters Patent is hereby corrected as shown below:

On the title page, item [56]:

In the References Cited, U.S. PATENT DOCUMENTS, line 3, "Fukue" should read --Fukui--; line 6, "Gottlieb" should read --Gottlieb et al--.

Column 10, line 36, "rank" should read --crank--.

Signed and Sealed this

Twenty-third Day of March, 1999

Attest:

Q. TODD DICKINSON

*Attesting Officer*   *Acting Commissioner of Patents and Trademarks*